US012302142B2

(12) United States Patent
Koskinen et al.

(10) Patent No.: US 12,302,142 B2
(45) Date of Patent: May 13, 2025

(54) APPARATUS, METHOD AND COMPUTER PROGRAM

(71) Applicant: Nokia Technologies Oy, Espoo (FI)

(72) Inventors: Jussi-Pekka Koskinen, Oulu (FI); Samuli Heikki Turtinen, Ii (FI); Jarkko Tuomo Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 290 days.

(21) Appl. No.: 17/774,955

(22) PCT Filed: Nov. 6, 2020

(86) PCT No.: PCT/EP2020/081306
§ 371 (c)(1),
(2) Date: May 6, 2022

(87) PCT Pub. No.: WO2021/089789
PCT Pub. Date: May 14, 2021

(65) Prior Publication Data
US 2022/0386155 A1 Dec. 1, 2022

(30) Foreign Application Priority Data
Nov. 8, 2019 (GB) .................................. 1916259

(51) Int. Cl.
*H04W 24/08* (2009.01)
*H04W 24/10* (2009.01)
(52) U.S. Cl.
CPC ........... *H04W 24/08* (2013.01); *H04W 24/10* (2013.01)

(58) Field of Classification Search
None
See application file for complete search history.

(56) References Cited

U.S. PATENT DOCUMENTS

| 2012/0044836 | A1* | 2/2012 | Sivavakeesar | ........ H04W 24/02 370/255 |
| 2017/0295567 | A1* | 10/2017 | Chen | ....................... H04W 4/70 |
| 2018/0167836 | A1* | 6/2018 | Axmon | .................. H04W 24/10 |
| 2019/0320490 | A1* | 10/2019 | Liu | .................... H04W 52/0229 |
| 2020/0275296 | A1* | 8/2020 | Chen | ....................... H04W 76/28 |
| 2020/0374725 | A1* | 11/2020 | Chen | ....................... H04L 5/0053 |
| 2021/0400508 | A1* | 12/2021 | Ohara | ............... H04W 52/0216 |

(Continued)

FOREIGN PATENT DOCUMENTS

| CN | 108307686 A | 7/2018 |
| EP | 3 289 803 A | 11/2016 |

OTHER PUBLICATIONS

3GPP TSG-RAN WG2 Meeting #106, Reno, USA, May 13-17, 2019, R2-1906697, "Power consumption reduction in RRM measurements", Nokia, Nokia Shanghai Bell, 6 pgs.

(Continued)

*Primary Examiner* — Xavier S Wong
(74) *Attorney, Agent, or Firm* — McCarter & English LLP

(57) ABSTRACT

There is provided an apparatus, said apparatus including circuitry for receiving, at a user equipment from a network, an indication to perform radio resource management measurements at the user equipment in a first mode, wherein, in the first mode, measurement requirements are more relaxed than in a second mode and performing radio resource management measurements in the first mode.

11 Claims, 7 Drawing Sheets

(56) References Cited

U.S. PATENT DOCUMENTS

2022/0095223 A1* 3/2022 Ohara .............. H04W 52/0229

OTHER PUBLICATIONS

3GPP TSG-RAN WG2 Meeting #107bis, Chongqing, China, Oct. 14-18, 2019, R2-1912334, "RRM measurement relaxation criteria", vivo, 5 pgs.
3GPP TSG-RAN WG2 Meeting #107bis, Chongqing, China, Oct. 14-18, 2019, R2-1913106, "Dedicated RRM Measurement Relaxation", Nokia, Nokia Shanghai Bell, 2 pgs.
"Power Saving for RRM Measurements in NR", MediaTek Inc., 3GPP TSG-RAN WG2 Meeting #107bis, R2-1913002, Oct. 2019, 6 pages.
"UE Power Consumption Reduction in KRM Measurement", vivo, 3GPP TSG-RAN, WG2 Meeting #105bis, R2-1903206, Apr. 2019, 10 pages.

* cited by examiner

Figure 5

T1: Providing, to a user equipment from a network, an indication to perform radio resource management measurements at the user equipment in a first mode, wherein, in the first mode, measurement requirements are more relaxed than in a second mode.

APPARATUS, METHOD AND COMPUTER PROGRAM

CROSS REFERENCE TO RELATED APPLICATION

This patent application is a U.S. National Stage application of International Patent Application Number PCT/EP2020/081306 filed Nov. 6, 2020, which is hereby incorporated by reference in its entirety, and claims priority to GB 1916259.3 filed Nov. 8, 2019.

FIELD

The present application relates to a method, apparatus, system and computer program and in particular but not exclusively to power saving in radio resource management (RRM) measurements.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). Some wireless systems can be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

In a first aspect there is provided an apparatus comprising means for receiving, at a user equipment from a network, an indication to perform radio resource management measurements at the user equipment in a first mode, wherein, in the first mode, measurement requirements are more relaxed than in a second mode and performing radio resource management measurements in the first mode.

The apparatus may comprise means for providing results of the radio resource management measurements from the user equipment to the network.

In the first mode, the user equipment may be configured to, at least one of, use fewer receiver chains to perform radio resource management measurements, perform radio resource management measurements with decreased accuracy and perform radio resource management measurements for fewer discontinuous reception cycles than in the second mode.

The apparatus may comprise means for receiving an indication of a configuration for the first mode from the network at the user equipment.

The indication to perform radio resource management measurements in the first mode may be valid when the user equipment is operating in idle, inactive or connected state.

The indication to perform radio resource management measurements in the first mode may comprise an indicator for allowance or disallowance of performing radio resource management measurements in the first mode.

The apparatus may comprise means for receiving the indication to perform radio resource management measurements in the first mode in at least one of dedicated radio resource control signalling, broadcast radio resource control signalling, a medium access control, MAC, control element and downlink control information.

In a second aspect there is provided an apparatus comprising means for providing, to a user equipment from a network, an indication to perform radio resource management measurements at the user equipment in a first mode, wherein, in the first mode, measurement requirements are more relaxed than in a second mode.

The apparatus may comprise means for receiving results of radio resource management measurements performed in the first mode from the user equipment at the network.

The apparatus may comprise means for providing an indication of a configuration for the first mode from the network to the user equipment.

The indication to perform radio resource management measurements in the first mode may be valid when the user equipment is operating in idle, inactive or connected state.

The indication to perform radio resource management measurements in the first mode may comprise an indicator for allowance or disallowance of performing radio resource management measurements in the first mode.

The apparatus may comprise means for providing the indication to perform radio resource management measurements in the first mode in at least one of dedicated radio resource control signalling, broadcast radio resource control signalling, a medium access control, MAC, control element and downlink control information.

In a third aspect there is provided a method comprising receiving, at a user equipment from a network, an indication to perform radio resource management measurements at the user equipment in a first mode, wherein, in the first mode, measurement requirements are more relaxed than in a second mode and performing radio resource management measurements in the first mode.

The method may comprise providing results of the radio resource management measurements from the user equipment to the network.

In the first mode, the user equipment may be configured to, at least one of, use fewer receiver chains to perform radio resource management measurements, perform radio resource management measurements with decreased accuracy and perform radio resource management measurements for fewer discontinuous reception cycles than in the second mode.

The method may comprise receiving an indication of a configuration for the first mode from the network at the user equipment.

The indication to perform radio resource management measurements in the first mode may be valid when the user equipment is operating in idle, inactive or connected state.

The indication to perform radio resource management measurements in the first mode may comprise an indicator for allowance or disallowance of performing radio resource management measurements in the first mode.

The method may comprise receiving the indication to perform radio resource management measurements in the first mode in at least one of dedicated radio resource control signalling, broadcast radio resource control signalling, a medium access control, MAC, control element and downlink control information.

In a fourth aspect there is provided a method comprising providing, to a user equipment from a network, an indication to perform radio resource management measurements at the user equipment in a first mode, wherein, in the first mode, measurement requirements are more relaxed than in a second mode.

The method may comprise receiving results of radio resource management measurements performed in the first mode from the user equipment at the network.

The method may comprise providing an indication of a configuration for the first mode from the network to the user equipment.

The indication to perform radio resource management measurements in the first mode may be valid when the user equipment is operating in idle, inactive or connected state.

The indication to perform radio resource management measurements in the first mode may comprise an indicator for allowance or disallowance of performing radio resource management measurements in the first mode.

The method may comprise providing the indication to perform radio resource management measurements in the first mode in at least one of dedicated radio resource control signalling, broadcast radio resource control signalling, a medium access control, MAC, control element and downlink control information.

In a fifth aspect there is provided an apparatus comprising: at least one processor and at least one memory including a computer program code, the at least one memory and computer program code configured to, with the at least one processor, cause the apparatus at least to receive, at a user equipment from a network, an indication to perform radio resource management measurements at the user equipment in a first mode, wherein, in the first mode, measurement requirements are more relaxed than in a second mode and perform radio resource management measurements in the first mode.

The apparatus may be configured to provide results of the radio resource management measurements from the user equipment to the network.

In the first mode, the user equipment may be configured to, at least one of, use fewer receiver chains to perform radio resource management measurements, perform radio resource management measurements with decreased accuracy and perform radio resource management measurements for fewer discontinuous reception cycles than in the second mode.

The apparatus may be configured to receive an indication of a configuration for the first mode from the network at the user equipment.

The indication to perform radio resource management measurements in the first mode may be valid when the user equipment is operating in idle, inactive or connected state.

The indication to perform radio resource management measurements in the first mode may comprise an indicator for allowance or disallowance of performing radio resource management measurements in the first mode.

The apparatus may be configured to receive the indication to perform radio resource management measurements in the first mode in at least one of dedicated radio resource control signalling, broadcast radio resource control signalling, a medium access control, MAC, control element and downlink control information.

In a sixth aspect there is provided an apparatus comprising: at least one processor and at least one memory including a computer program code, the at least one memory and computer program code configured to, with the at least one processor, cause the apparatus at least to provide, to a user equipment from a network, an indication to perform radio resource management measurements at the user equipment in a first mode, wherein, in the first mode, measurement requirements are more relaxed than in a second mode.

The apparatus may be configured to receive results of radio resource management measurements performed in the first mode from the user equipment at the network.

The apparatus may be configured to provide an indication of a configuration for the first mode from the network to the user equipment.

The indication to perform radio resource management measurements in the first mode may be valid when the user equipment is operating in idle, inactive or connected state.

The indication to perform radio resource management measurements in the first mode may comprise an indicator for allowance or disallowance of performing radio resource management measurements in the first mode.

The apparatus may be configured to provide the indication to perform radio resource management measurements in the first mode in at least one of dedicated radio resource control signalling, broadcast radio resource control signalling, a medium access control, MAC, control element and downlink control information.

In a seventh aspect there is provided a computer readable medium comprising program instructions for causing an apparatus to perform at least the following receiving, at a user equipment from a network, an indication to perform radio resource management measurements at the user equipment in a first mode, wherein, in the first mode, measurement requirements are more relaxed than in a second mode and performing radio resource management measurements in the first mode.

The apparatus may be caused to perform providing results of the radio resource management measurements from the user equipment to the network.

In the first mode, the user equipment may be configured to, at least one of, use fewer receiver chains to perform radio resource management measurements, perform radio resource management measurements with decreased accuracy and perform radio resource management measurements for fewer discontinuous reception cycles than in the second mode.

The apparatus may be caused to perform receiving an indication of a configuration for the first mode from the network at the user equipment.

The indication to perform radio resource management measurements in the first mode may be valid when the user equipment is operating in idle, inactive or connected state.

The indication to perform radio resource management measurements in the first mode may comprise an indicator for allowance or disallowance of performing radio resource management measurements in the first mode.

The apparatus may be caused to perform receiving the indication to perform radio resource management measurements in the first mode in at least one of dedicated radio resource control signalling, broadcast radio resource control signalling, a medium access control, MAC, control element and downlink control information.

In an eighth aspect there is provided a computer readable medium comprising program instructions for causing an apparatus to perform at least the following providing, to a user equipment from a network, an indication to perform radio resource management measurements at the user equipment in a first mode, wherein, in the first mode, measurement requirements are more relaxed than in a second mode.

The apparatus may be caused to perform receiving results of radio resource management measurements performed in the first mode from the user equipment at the network.

The apparatus may be caused to perform providing an indication of a configuration for the first mode from the network to the user equipment.

The indication to perform radio resource management measurements in the first mode may be valid when the user equipment is operating in idle, inactive or connected state.

The indication to perform radio resource management measurements in the first mode may comprise an indicator for allowance or disallowance of performing radio resource management measurements in the first mode.

The apparatus may be caused to perform providing the indication to perform radio resource management measurements in the first mode in at least one of dedicated radio resource control signalling, broadcast radio resource control signalling, a medium access control, MAC, control element and downlink control information.

In a ninth aspect there is provided a non-transitory computer readable medium comprising program instructions for causing an apparatus to perform at least the method according to the third or fourth aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 5 shows a flowchart of a method according to an example embodiment;

DETAILED DESCRIPTION

Before explaining in detail the examples, certain general principles of a wireless communication system and mobile communication devices are briefly explained with reference to FIGS. 1 to 3 to assist in understanding the technology underlying the described examples.

Figure 1:
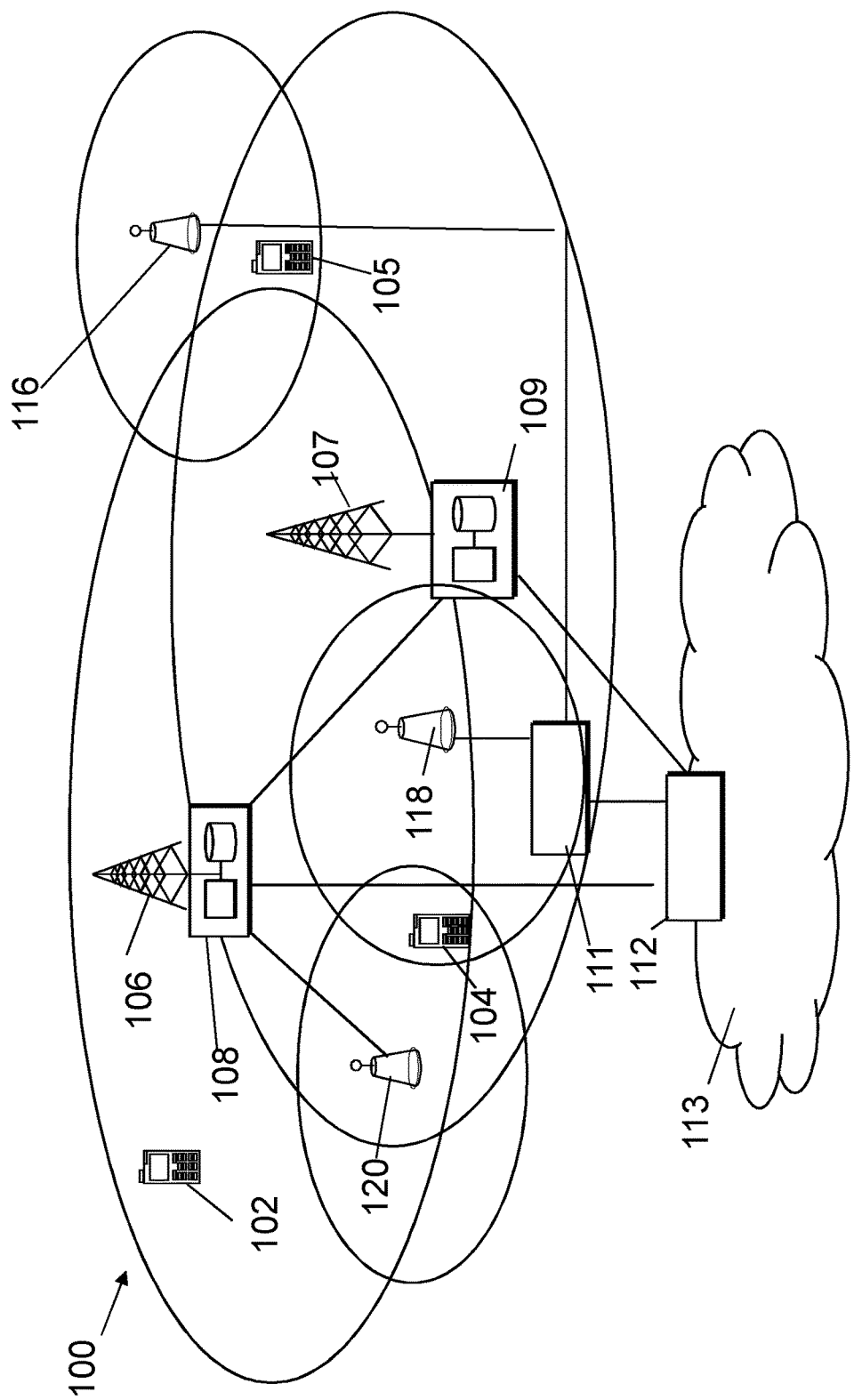
FIG. 1 shows a schematic diagram of an example communication system comprising a base station and a plurality of communication devices.

In a wireless communication system 100, such as that shown in FIG. 1, communication devices (e.g., user equipment (UE)) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a Radio Access Network (RAN) (e.g. wireless communication system 100) or in a core network (CN) (not shown) and may be implemented as one central apparatus or its functionality may be distributed over several apparatuses. The controller apparatus may be part of the base station and/or provided by a separate entity such as a radio network controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, base stations 116 and 118 are connected via a gateway 111 whilst base station 120 connects via the controller apparatus 108. In some embodiments, the smaller base stations may not be provided. Smaller base stations 116, 118 and 120 may be part of a second network, for example WLAN and may be WLAN Access Points (APs).

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE (LTE-A) employs a radio mobile architecture known as the Evolved Universal Terrestrial Radio Access Network (E-UTRAN) and a core network known as the Evolved Packet Core (EPC). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN). A base station can provide coverage for an entire cell or similar radio service area. Core network elements include Mobility Management Entity (MME), Serving Gateway (S-GW) and Packet Gateway (P-GW).

An example of a suitable communications system is the 5G or NR concept. Network architecture in NR may be similar to that of LTE-advanced. Base stations of NR systems may be known as next generation Node Bs (gNBs). Changes to the network architecture may depend on the need to support various radio technologies and finer QoS support, and some on-demand requirements for e.g. Quality of Service (QoS) levels to support Quality of Experience (QoE) for a user. Also network aware services and applications, and service and application aware networks may bring changes to the architecture. Those are related to Information Centric Network (ICN) and User-Centric Content Delivery Network (UC-CDN) approaches. NR may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

Future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

An example 5G core network (CN) comprises functional entities. The CN is connected to a UE via the radio access network (RAN). A User Plane Function (UPF) whose role is called PDU Session Anchor (PSA) may be responsible for forwarding frames back and forth between the data network (DN) and the tunnels established over the 5G towards the UE(s) exchanging traffic with the DN.

The UPF is controlled by an Session Management Function (SMF) that receives policies from a Policy Control Function (PCF). The CN may also include an Access & Mobility Function (AMF).

Figure 2:
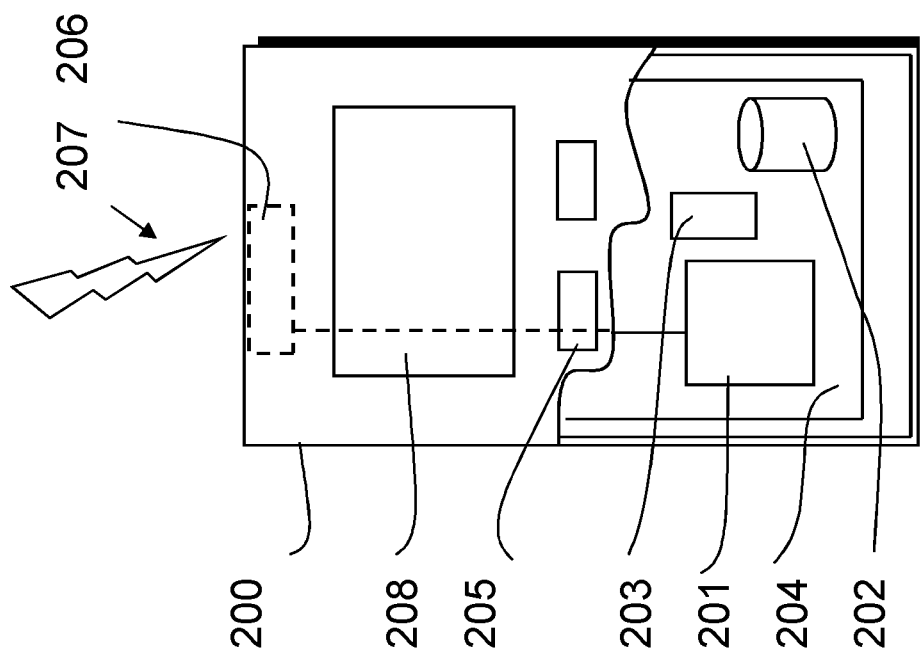
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, voice over IP (VoIP) phones, portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), smart devices, wireless customer-premises equipment (CPE), or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
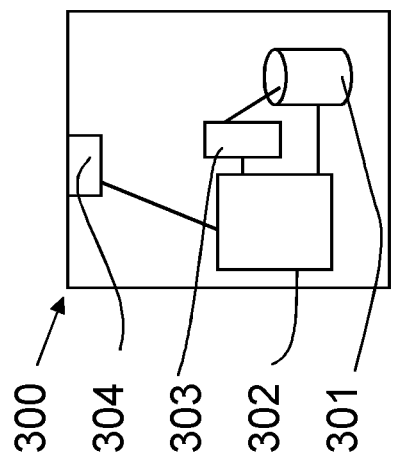
FIG. 3 shows a schematic diagram of an example control apparatus.

FIG. 3 shows an example of a control apparatus 300 for a communication system, for example to be coupled to and/or for controlling a station of an access system, such as a RAN node, e.g. a base station, eNB or gNB, a relay node or a core network node such as an MME or S-GW or P-GW, or a core network function such as AMF/SMF, or a server or host. The method may be implemented in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

The following relates to NR UE power saving when the UE is in RRC IDLE, INACTIVE and CONNECTED state. A UE power saving study item was finished in RAN2 and the work item will be started in June 2019 in RAN2. One consideration is radio resource management (RRM) measurement relaxation. Performing RRM measurements consumes UE battery. It may be beneficial to avoid unnecessary measurements. Relaxing measurement requirements may help to reduce the power used for RRM measurements.

The four RRM measurements in Long Term Evolution (LTE) system are Channel Quality Indicator (CQI), Reference Signal Received Power (RSRP), Reference Signal Received Quality (RSRQ), and Carrier Received Signal Strength Indicator (RSSI). In NR, RRM measurements are Channel State Information (CSI), RSRP and RSRQ.

Reduced (or relaxed) measurement performance has been specified in REL12. The network may configure criteria for the UE when a certain measurement configuration should be adopted. This may be referred to as UE based measurement configuration selection. Alternatively, in a scheme known as S-measure, RRM measurements may be relaxed based on the radio quality conditions measured by the UE, i.e., RSRP/RSRQ conditions. The UE is allowed not to measure neighbor cells if the serving cell quality is good enough.

Figure 4:
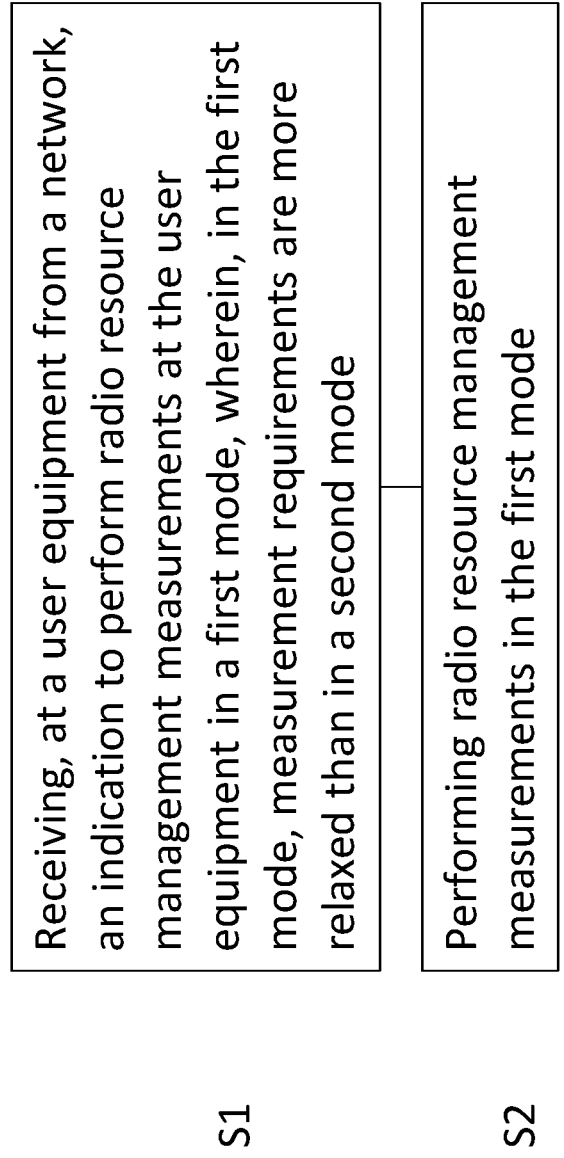
FIG. 4 shows a flowchart of a method according to an example embodiment.

FIG. 4 shows a flowchart of a method according to an example embodiment. The method may be performed at a UE.

In a first step, S1, the method comprises receiving, at a user equipment from a network, an indication to perform radio resource management measurements at the user equipment in a first mode, wherein, in the first mode, measurement requirements are more relaxed than in a second mode.

In a second step, S2, the method comprises performing radio resource management measurements in the first mode.

The method may comprise providing results of the radio resource management measurements from the user equipment to the network. The user equipment may provide the RRM measurement results when it is in connected mode.

FIG. 5 shows a flowchart of a method according to an example embodiment. The method may be performed at a network node, such as a gNB.

In a first step, T1, the method comprises providing, to a user equipment from a network, an indication to perform radio resource management measurements at the user equipment in a first mode, wherein, in the first mode, measurement requirements are more relaxed than in a second mode.

In this method, the network indicates to the UE when the UE is allowed to relax measurement requirements. The measurement requirements of the UE are thus under network control. Using such a method may provide robust mobility performance. Radio link failures (RLF) and handover failures may be minimized compared to the scenario where the UE is allowed to autonomously relax the measurements.

The trigger for the network to indicate to the UE to perform RRM measurements in the first mode may be network specific. For example, the trigger may be based on network observations on UE mobility, UE location on the cell i.e. cell center, ongoing traffic type e.g. high/low priority, QCI/QoS amongst others.

Measurement requirements may include, among others, the accuracy of the measurements, the frequency of the measurements and/or the number of receiver (Rx) chains used to perform measurements. Relaxing the measurement requirements may comprises decreasing the required accuracy of the measurements, decreasing the frequency of the measurements and/or decreasing the number of Rx chains used to perform measurements.

In a first example embodiment, in the first mode, the UE may be configured to use fewer Rx chains to perform measurements, i.e., the UE is allowed to use limited amount of Rx chains in the first mode.

In another example embodiment, the UE may be configured to perform measurements with decreased accuracy. That is, the UE is allowed to measure with decreased measurement accuracy, e.g., plus/minus x dB accuracy to regular accuracy requirements defined in RAN4 specifications, where x correspond to a level of accuracy. The level x may be indicated by a network node within the configuration separately e.g., separate to the indication of allowance to measure with decreased measurement accuracy. The level x may be indicated by a network node within the configuration combined with the indication of allowance to measure with decreased measurement accuracy.

In another example embodiment, the UE may be configured to perform measurements for fewer discontinuous reception cycles. That is, the UE may be allowed to skip measurements for a certain amount of DRX cycles.

The configuration of the first mode may be fixed in the specification or configured via signaling. The signalling may be RRC Reconfiguration or system information messages. The method may comprise receiving an indication of a configuration for the first mode from the network at the user equipment.

The indication of the configuration may comprise configuration information, e.g., the x dB accuracy, the number of Rx chains or the number of DRX cycles for which measurements can be skipped. The network may be able to incrementally increase or decrease measurement requirements, that is, the indication of the configuration may comprise an indication of an incremental increase or decrease in measurement requirements. For example, a gNB may first decrease the measurement by one level and subsequently increase or decrease by a further level or levels. The indication of the configuration may be 1-bit, a bit sequence, or an enumeration of values which correspond to x dB accuracy, a number of Rx chains or a number of DRX cycles for which measurements can be skipped, an incremental increase or an incremental decrease. The indication of the configuration may be provided by the network node separately from, or combined with, the indication to perform RRM measurements in the first mode.

The indication to perform radio resource management measurements in the first mode may comprise an indicator for allowance or disallowance of performing radio resource management measurements in the first mode. The indication may be 1-bit, a bit sequence, enumeration of values which correspond to allowance, disallowance, etc.

The indication to perform radio resource management measurements in the first mode may be provided in at least one of dedicated RRC signalling, broadcast RRC signalling, a medium access control (MAC) control element (CE) and downlink control information (DCI).

The indication to perform radio resource management measurements in the first mode may be valid when the UE is operating in IDLE, INACTIVE or CONNECTED state. That is, the indication may be to perform RRM measurements in the first mode when the UE moves to a connected, inactive or idle mode.

Figure 6:
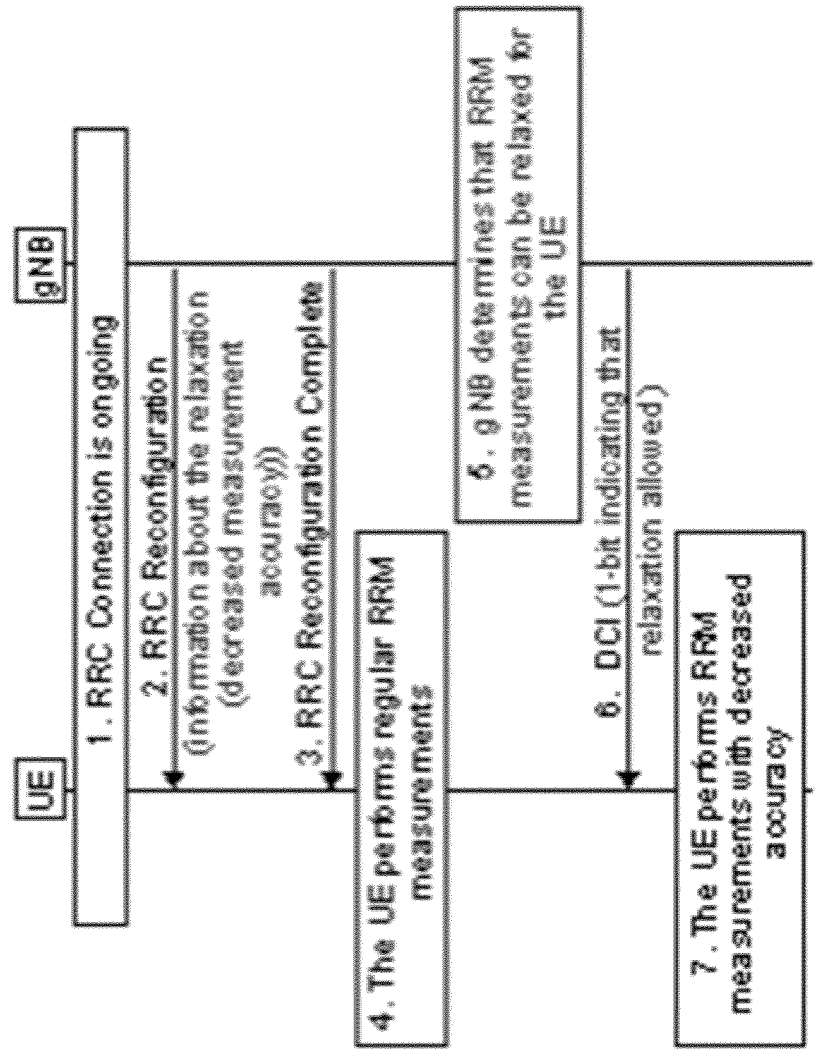
FIG. 6 shows a signalling flow between a UE and a gNB according to an example embodiment.

FIG. 6 shows a signalling flow between a UE and a gNB for an example embodiment. In step 1 there is an ongoing RRC Connection between a UE and a gNB.

In step 2, the gNB sends an RRC Reconfiguration message to the UE which includes configuration information about the relaxation in measurement requirements for the first mode (in this example decreased measurement accuracy). In step 3 the RRC Reconfiguration is complete and in step 4, the UE performs regular RRM measurements.

In step 5, the gNB determines that RRM measurements can be relaxed for the UE.

In step 6, the gNB sends a 1-bit indicator in DCI indicating that relaxation of the measurement requirements is allowed.

In step 7, the UE performs RRM measurements with decreased accuracy.

Figure 7:
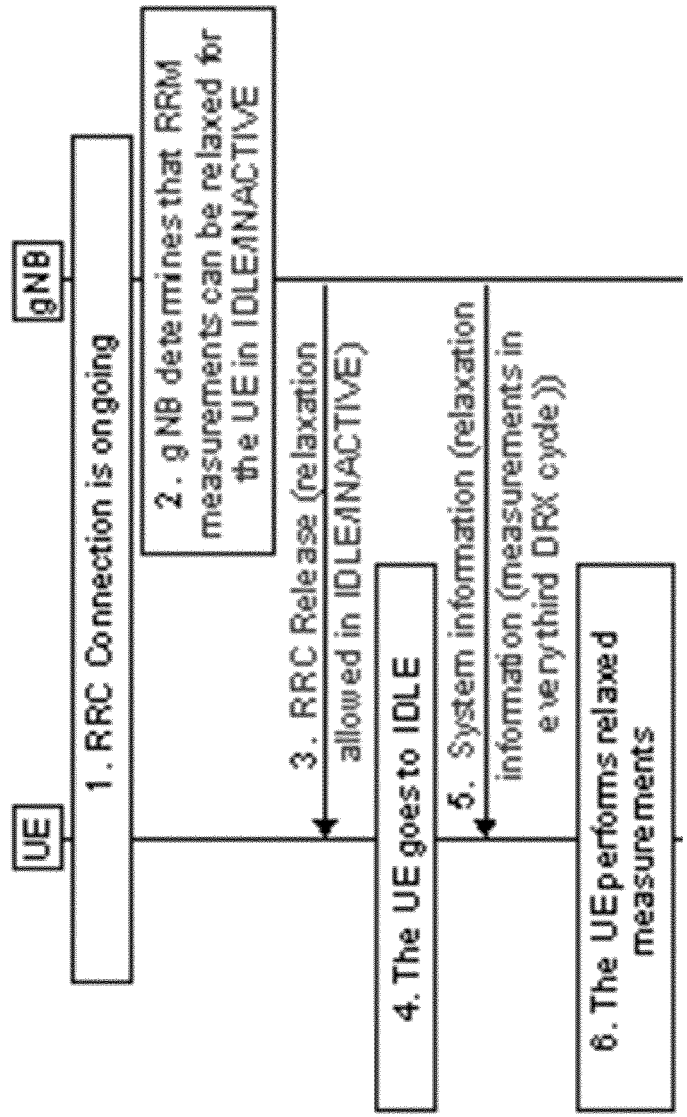
FIG. 7 shows a signalling flow between a UE and a gNB according to an example embodiment.

FIG. 7 shows a signalling flow between a UE and a gNB for an example embodiment where the network allows relaxed measurements when the UE is in IDLE or INACTIVE states.

In step 1 there is an ongoing RRC Connection between a UE and a gNB.

In step 2, the gNB determines that RRM measurements may be relaxed for the UE when it is in the IDLE or INACTIVE state.

In step 3, the gNB sends a RRC Release message to the UE including an indication that relaxed measurement requirements are allowed in IDLE and INACTIVE states.

In step 4, the UE goes to IDLE state.

In step 5, the gNB provides system information to the UE which includes configuration information about the relaxation in measurement requirements for the first mode (in this example, measurements are to be performed every third DRX cycle).

In step 6, the UE performs relaxed measurements, i.e., measurements every third DRX cycle.

An apparatus may comprise means for receiving, at a user equipment from a network, an indication to perform radio resource management measurements at the user equipment in a first mode, wherein, in the first mode, measurement requirements are more relaxed than in a second mode and performing radio resource management measurements in the first mode.

Alternatively, or in addition, an apparatus may comprise means for providing, to a user equipment from a network, an indication to perform radio resource management measurements at the user equipment in a first mode, wherein, in the first mode, measurement requirements are more relaxed than in a second mode.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst some embodiments have been described in relation to NR and RRM measurements, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. A method comprising:
   receiving, at a user equipment from a network, criteria defining when radio resource management measurements at the user equipment can be performed in a first mode, wherein, in the first mode, measurement requirements are more relaxed than in a second mode;
   receiving, at the user equipment from the network, an indication to perform radio resource management measurements at the user equipment in the first mode, wherein the indication is based on at least one of a mobility status of the user equipment or channel quality of the user equipment, and
   wherein the indication to perform radio resource management measurements in the first mode is valid when the user equipment is operating in a radio resource control connected state, is received in a dedicated radio resource control resource control signaling, and comprises an indicator for allowance of performing radio resource management measurements in the first mode, such that performing radio resource management measurements at the user equipment in the first mode is under control of the network; and
   performing radio resource management measurements in the first mode,
   wherein, in the first mode, the user equipment is configured to perform radio resource management measurements with decreased accuracy compared to measurement accuracy in the second mode; and
   providing results of the radio resource management measurements with decreased accuracy from the user equipment to the network.

2. A method comprising:
   providing, to a user equipment from a network, criteria defining when radio resource management measurements at the user equipment can be performed in a first mode, wherein, in the first mode, measurement requirements are more relaxed than in a second mode;
   detecting a trigger to transmit an indication to the user equipment to perform radio resource management measurements at the user equipment in the first mode, wherein the detecting the trigger is based on at least one of a mobility status of the user equipment or channel quality of the user equipment;
   providing, to the user equipment from the network, the indication to perform radio resource management measurements at the user equipment in the first mode,
   wherein the indication to perform radio resource management measurements in the first mode is valid when the user equipment is operating in a radio resource control connected state, is received in a dedicated radio resource control resource control signaling, and
   comprises an indicator for allowance of performing radio resource management measurements in the first mode, such that performing radio resource management measurements at the user equipment in the first mode is under control of the network,
   wherein, in the first mode, the user equipment is configured to perform radio resource management measurements with decreased accuracy compared to measurement accuracy in the second mode; and
   receiving results of the radio resource management measurements with decreased accuracy from the user equipment.

3. A user equipment comprising:
   at least one processor; and
   at least one memory storing instructions that when executed with the at least one processor, cause the user equipment at least to:
      receive, at the user equipment from a network, criteria defining when radio resource management measurements at the user equipment can be performed in a first mode, wherein, in the first mode, measurement requirements are more relaxed than in a second mode;
      receive, at the user equipment from the network, an indication to perform radio resource management measurements at the user equipment in a first mode, wherein the indication is based on at least one of a mobility status of the user equipment or channel quality of the user equipment, and wherein the indication to perform radio resource management measurements in the first mode is valid when the user equipment is operating in a radio resource control connected state, is received in a dedicated radio resource control signalling and comprises an indicator for allowance of performing radio resource management measurements in the first mode, such that performing radio resource management measurements at the user equipment in the first mode is under control of the network; and perform radio resource management measurements in the first mode, wherein, in the first mode, the user equipment is configured to perform radio resource management measurements with decreased accuracy compared to measurement accuracy in the second mode; and provide results of the radio resource management measurements with decreased accuracy from the user equipment to the network.

4. The user equipment according to claim 3, wherein, in the first mode, the user equipment is configured to use fewer receiver chains to perform radio resource management measurements compared to the number of receiver chains used for radio resource management measurements in the second mode.

5. The user equipment according to claim 3, wherein the at least one memory is storing instructions that when executed with the at least one processor cause the user equipment at least to:

use fewer receiver chains to perform radio resource management measurements for fewer discontinuous reception cycles than in the second mode.

6. The user equipment according to claim 3, wherein the at least one memory is storing instructions that when executed with the at least one processor cause the user equipment at least to: receive an indication of a configuration for the first mode from the network at the user equipment, and wherein the configuration is combined with the indication to perform radio resource management measurements at the user equipment in the first mode.

7. An apparatus comprising:

at least one processor; and at least one memory, the at least one memory storing instructions that when executed by the at least one processor, cause the apparatus at least to:

provide, to a user equipment from a network, criteria defining when radio resource management measurements at the user equipment can be performed in a first mode, wherein, in the first mode, measurement requirements are more relaxed than in a second mode;

detect a trigger to transmit an indication to the user equipment to perform radio resource management measurements at the user equipment in the first mode, wherein detecting the trigger is based on at least one of a mobility status of the user equipment or channel quality of the user equipment;

provide, to the user equipment from the network, the indication to perform radio resource management measurements at the user equipment in the first mode, wherein the indication to perform radio resource management measurements in the first mode is valid when the user equipment is operating in a radio resource control connected state, is received in a dedicated radio resource control signalling and comprises an indicator for allowance of performing radio resource management measurements in the first mode, such that performing radio resource management measurements at the user equipment in the first mode is under control of the network, wherein, in the first mode, the user equipment is configured to perform radio resource management measurements with decreased accuracy compared to measurements in the second mode; and receive results of the radio resource management measurements with decreased accuracy from the user equipment.

8. The apparatus according to claim 7, wherein, in the first mode, the user equipment is configured to use fewer receiver chains to perform radio resource management measurements compared to the number of receiver chains used for radio resource management measurements in the second mode.

9. The apparatus according to claim 7, wherein the at least one memory is storing instructions that when executed with the at least one processor cause the apparatus at least to: provide an indication of a configuration for performing the measurements in the first mode from the network to the user equipment, wherein the configuration is combined with the indication to perform radio resource management measurements at the user equipment in the first mode.

10. A non-transitory computer readable medium comprising program instructions for causing a user equipment to perform at least the following:

receiving, at the user equipment from a network, criteria defining when radio resource management measurements at the user equipment can be performed in a first mode, wherein, in the first mode, measurement requirements are more relaxed than in a second mode;

receiving, at the user equipment from the network, an indication to perform radio resource management measurements at the user equipment in the first mode, wherein the indication to perform radio resource management measurements in the first mode is valid when the user equipment is operating in a radio resource control connected state, is received in a dedicated radio resource control resource control signalling and comprises an indicator for allowance of performing radio resource management measurements in the first mode, such that performing radio resource management measurements at the user equipment in the first mode is under control of the network; and performing radio resource management measurements in the first mode, wherein, in the first mode, the user equipment is configured to perform radio resource management measurements with decreased accuracy compared to measurements in the second mode; and provide results of the radio resource management measurements with decreased accuracy from the user equipment to the network.

11. A non-transitory computer readable medium comprising program instructions for causing an apparatus to perform at least the following:

providing, to a user equipment from a network, criteria defining when radio resource management measurements at the user equipment can be performed in a first mode, wherein, in the first mode, measurement requirements are more relaxed than in a second mode;

detecting a trigger to transmit an indication to the user equipment to perform radio resource management measurements at the user equipment in the first mode, wherein the detecting the trigger is based on at least one of a mobility status of the user equipment or channel quality of the user equipment;

providing, to the user equipment from a network, the indication to perform radio resource management measurements at the user equipment in the first mode, wherein, in the first mode, measurement requirements are more relaxed than in a second mode, wherein the indication to perform radio resource management measurements in the first mode is valid when the user equipment is operating in a radio resource control connected state, is transmitted in a dedicated radio resource control resource control signalling and comprises an indicator for allowance of performing radio resource management measurements in the first mode, such that performing radio resource management measurements at the user equipment in the first mode is under control of the network, wherein, in the first mode, the user equipment is configured to perform radio resource management measurements with decreased accuracy compared to measurements in the second mode; and receiving results of the radio resource management measurements with decreased accuracy from the user equipment.

* * * * *